United States Patent [19]

Loynes et al.

[11] Patent Number: 4,747,631
[45] Date of Patent: May 31, 1988

[54] CABLE LOCKING AND SEALING DEVICE

[75] Inventors: Leslie M. Loynes; Jack E. Bledsoe, both of Fremont; Clarence A. Penick, Jr., Hudson; Jerry A. Bystry, Orland; Richard C. Horr, Pleasant Lake; James A. Haddix; Roger J. Green, both of Angola, all of Ind.

[73] Assignee: Brammall, Inc., Angola, Ind.

[21] Appl. No.: 5,392

[22] Filed: Jan. 9, 1987

Related U.S. Application Data

[63] Continuation of Ser. No. 813,478, Dec. 26, 1985, abandoned.

[51] Int. Cl.⁴ .................. G09F 3/00; F16G 11/04
[52] U.S. Cl. .................. 292/307 R; 24/136 A; 292/323
[58] Field of Search .......... 292/307 R, 315, 321, 292/323, 325–326, 307 A, 307 B; 24/115 M, 115 H, 115 L, 136 R, 136 A, 155 BR, 488; 70/20, 30, 49

[56] References Cited

U.S. PATENT DOCUMENTS

| | | | |
|---|---|---|---|
| 830,565 | 9/1906 | Brown | 292/307 R |
| 3,770,307 | 11/1973 | Van Gompel | 292/307 R |
| 4,074,916 | 2/1978 | Schindler | 292/307 R |

Primary Examiner—Robert L. Wolfe
Attorney, Agent, or Firm—Hill, Van Santen, Steadman & Simpson

[57] ABSTRACT

Cable locking and sealing device which has a body member to which one end of a cable can be attached with the other end free to pass through a hasp or other device to be sealed or locked and in which the free end can then be inserted into the body member and can be freely moved in a first direction into the body member but which is clamped so that it cannot be removed from the body member in a second direction. Within the body member there is provided an inclined ramp at a small angle formed with a plurality of gear teeth and a locking gear formed with gear teeth which mate with the gear teeth on the rack and is movable along the ramp so as to lock the second end of the cable to the body member when force is exerted on it to remove it from the body member.

3 Claims, 1 Drawing Sheet

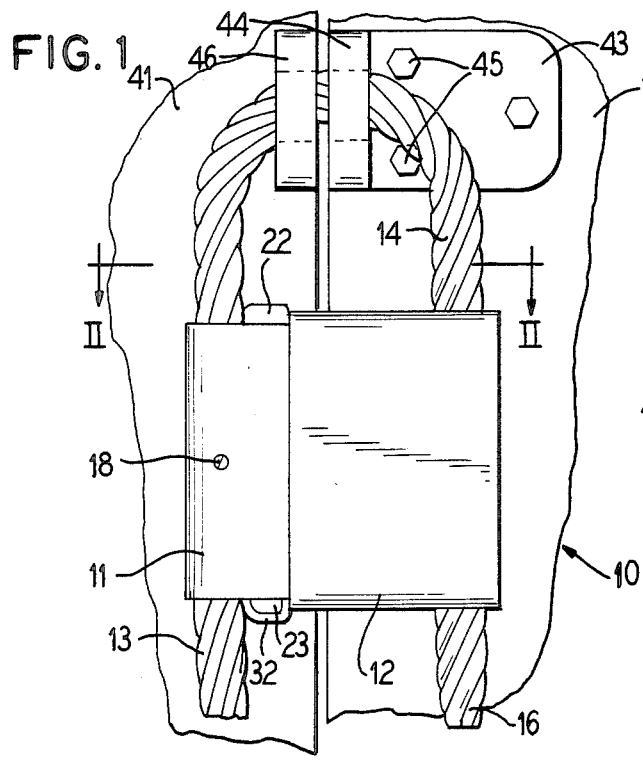
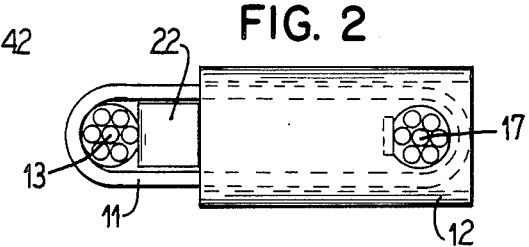
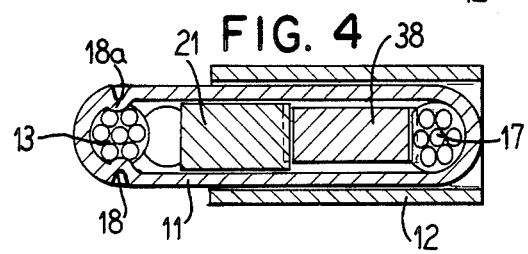
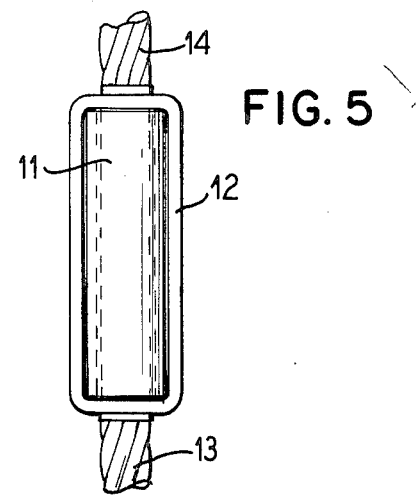
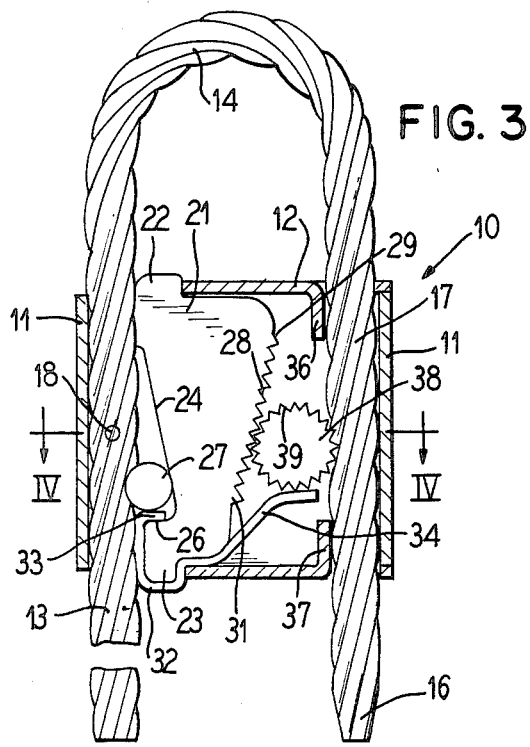
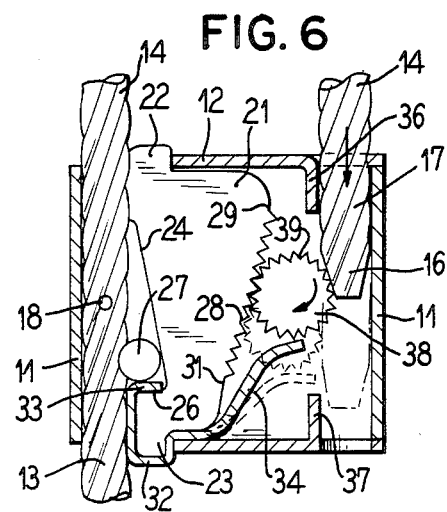

CABLE LOCKING AND SEALING DEVICE

This is a continuation of application Ser. No. 813,478 filed Dec. 26, 1985, and now abandoned.

BACKGROUND OF THE INVENTION

1. Field of the Invention

This invention relates in general to cable locking and sealing devices and in particular to a novel inclined ramp which has gear teeth formed thereon and a mating locking gear.

2. Description of the Prior Art

The assignee of the present invention is the owner of U.S. Pat. Nos. 3,770,307 and 4,074,916 which disclose cable locking and sealing devices. Such devices are used for sealing truck or railway car doors for example, by passing a cable through hasps and one end of the cable is attached to a body member and after the cable has been passed through the hasps, the free end is then inserted into the body member where it can be moved in a first direction into the body member but cannot be removed from the body member when these and other unauthorized persons attempt to open the seal and then reseal it.

SUMMARY OF THE INVENTION

The present invention provides a novel cable locking and sealing device which provides a novel inclined surface within the body member of the sealing device which is provided with gear teeth along its surface which mate with a toothed disc which has teeth that mate and roll along the inclined toothed surface so as to lock and clamp the end of the cable. The teeth on the disc lock into the teeth on the inclined surface so as to positively position the disc in a position to compress the cable within the body member and with teeth locking into and firmly gripping the cable. The inclined toothed surface of the block has a surface angle relative to the side wall of the body member of 15° and such relatively small angle assures that the seal cannot be opened. A spring biases the toothed disc against the cable and the inclined tooth member.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a plan view of the cable locking and sealing device of the invention in the locked position;

FIG. 2 is a top sectional view taken on line II—II from FIG. 1;

FIG. 3 is a sectional view through the invention;

FIG. 4 is a sectional view on line IV—IV from FIG. 3;

FIG. 5 is a side plan view of the invention; and

FIG. 6 is a sectional view of the invention illustrating the cable being inserted.

DESCRIPTION OF THE PREFERRED EMBODIMENTS

The cable sealing and locking device of the invention 10 includes a first inner body member 11 and a second outer body member 12 which is received over the inner body member 11 as illustrated in FIGS. 1, 2 and 4. A cable 13 passes through the body member 11 as shown and is staked by staking indentations 18 and 18a illustrated in FIG. 4 to the inner body member 11. A wedging member 21 illustrated in FIGS. 3, 4 and 6 is formed with projections 22 and 23 which extend beyond the walls of the outer body member 12 as illustrated. A relatively small disc 27 is mounted between the cable 13 and an inclined ramp 24 formed on a first side of the wedging member 21 and it engages the cable so as to lock the cable in an immovable position to the body member.

A portion of the cable 14 can be passed through hasps 46 and 44 illustrated in FIG. 1 to lock members 41 and 42 in a closed position. The hasps 46 and 44 are connected to the respective members by means such as a plate 43 and bolts 45 which lock the hasp 44 to the member 42. Similar bolts and plate means are provided for locking the hasp 46 to the member 41. After the portion 14 has been passed through the hasps 46 and 44 its end 16 is inserted into an opening formed in the body members 12 and 11 such that the end 17 engages a toothed disc 38 so as to rotate it in the clockwise direction relative to FIG. 6 down a toothed inclined plane 28 on the member 21. The tooth disc 38 is biased by a spring 32 which has an end 33 that fits within the confines of the first incline 24 and has a free end 34 which flexibly biases the toothed disc 38 as illustrated in FIG. 6, for example.

The outer body member 12 is formed with depressed portions 36 and 37 illustrated in FIGS. 3 and 6 so as to allow the end 16 and cable portion 17 to be inserted into the body member.

The inclined surface of member 21 extends from points 29 and 31 illustrated in FIGS. 3 and 6 and in a specific example 12 teeth were provided between points 29 and 31. The pitch of the teeth was 0.039 thousandths of a inch and the height of the teeth was 0.015 inch and the teeth had 60° angles between the surfaces of adjacent teeth The disc 38 is provided with 20 teeth which are equally spaced about the surface of the disc and the teeth had a radial length of 0.20 thousandths of an inch. The teeth 39 on the disc 38 mate with the teeth 28 on the inclined member 21 so that as the disc 38 is moved by the cable 17 downwardly relative to FIG. 3 and 6 the teeth 39 lock with the teeth 28 to rotate the disc 38 against the spring portion 34. After the end 16 has been inserted to the position illustrated, for example, in FIG. 3, the spring portion 34 will bias the disc 38 upwardly relative to FIG. 3 causing the gear teeth 39 to move along the teeth 28 of the wedging member 21 thus forcing the gear teeth 39 into the cable portion 17 thus to lock it. The teeth 39 have relatively sharp points which depress the cable and extend into it so as to firmly lock it to the body member.

Since the teeth 39 are in mesh with the teeth 28 of the inclined member 21, the disc 38 cannot slide or move relative to the member 21 unless the disc rotates. This locking action between the teeth 39 and teeth 28 further assures that the locking engagement of the disc 38 with the cable portion 17 will be maintained thus preventing the cable 17 from being withdrawn from the body member as, for example, by moving it upwardly relative to FIG. 3 since the teeth 39 prevents such movement.

The 15° incline of the teeth 28 is critical and the angle of the incline must be approximately 15° for proper operation of the device.

Although the invention has been described with respect to preferred embodiments, it is not to be so limited as changes and modifications can be made which are within the full intended scope of the invention as defined by the appended claims.

We claim as our invention:

1. A cable lock and seal device comprising a body member formed with first and second openings, a cable with a first end fixedly mounted in said first opening, a wedging member mounted in said body member adjacent said second opening, an inclined ramp formed on said wedging member on the side facing said second opening and a plurality of gear teeth formed in said inclined ramp, and said gear teeth having heights of 0.015 inches and adjacent teeth formed with 60 degree angles therebetween, a disc-shaped gear mounted between said wedging member with the teeth of said disc-shaped gear having radial lengths of 0.20 inches and said second opening in said body member and the teeth of said gear in mesh with the gear teeth on said inclined ramp such that the second end of said cable can be inserted into said second opening of said body member in a first direction so as to rotate said gear so that it moves along said ramp to make the second opening larger and such that when said second end of said cable is moved in a direction opposite to said first direction said gear moves along said ramp to make said second opening smaller to lock said cable to said body member and wherein said gear cannot slide on said ramp.

2. A cable lock and seal device according to claim 1 wherein said inclined ramp has a pitch of about 15 degrees.

3. A cable lock and seal device according to claim 2 including spring means biasing said gear along said ramp in a direction so as to make said second opening smaller.

* * * * *